United States Patent [19]
Carmon

[11] Patent Number: 5,200,981
[45] Date of Patent: Apr. 6, 1993

[54] FINE TIMING RECOVERY FOR QAM MODEM RECEIVER

[75] Inventor: Iddo Carmon, Kfar-Sava, Israel

[73] Assignee: National Semiconductor Corporation, Santa Clara, Calif.

[21] Appl. No.: 902,511

[22] Filed: Jun. 22, 1992

Related U.S. Application Data

[63] Continuation of Ser. No. 563,434, Aug. 7, 1990, abandoned.

[51] Int. Cl.$^5$ .............................................. H03D 3/24
[52] U.S. Cl. .................................... 375/106; 375/118
[58] Field of Search ............... 375/110, 118, 119, 106, 375/96, 8, 39, 120; 341/124

[56] References Cited

U.S. PATENT DOCUMENTS 3,512,093  5/1970  Perreault .
4,706,263  11/1987  Von der Embse ................... 375/96

FOREIGN PATENT DOCUMENTS 0174125  3/1986  European Pat. Off. .
0316459  5/1989  European Pat. Off. .
2598868  5/1986  France .

*Primary Examiner*—Curtis Kuntz
*Assistant Examiner*—Tesfaldet Bocure
*Attorney, Agent, or Firm*—Limbach & Limbach

[57] ABSTRACT

A QAM modem receiver performs fine-timing on a baseband signal sampled at two complex points per symbol. Based on this information, the algebraic signs of the second derivative of the baseband signal are estimated. These signs, computed separately for the real and imaginary axes, are used to a make local decision regarding convexity/concavity of the baseband signal. By accumulating these local decisions over an appropriate time interval, a global decision is reached regarding the sampling point position relative to the baseband signal maxima/minima. Based on this global decision, a correction command is issued to the modem's analog front end to either advance or delay the timing.

4 Claims, 6 Drawing Sheets

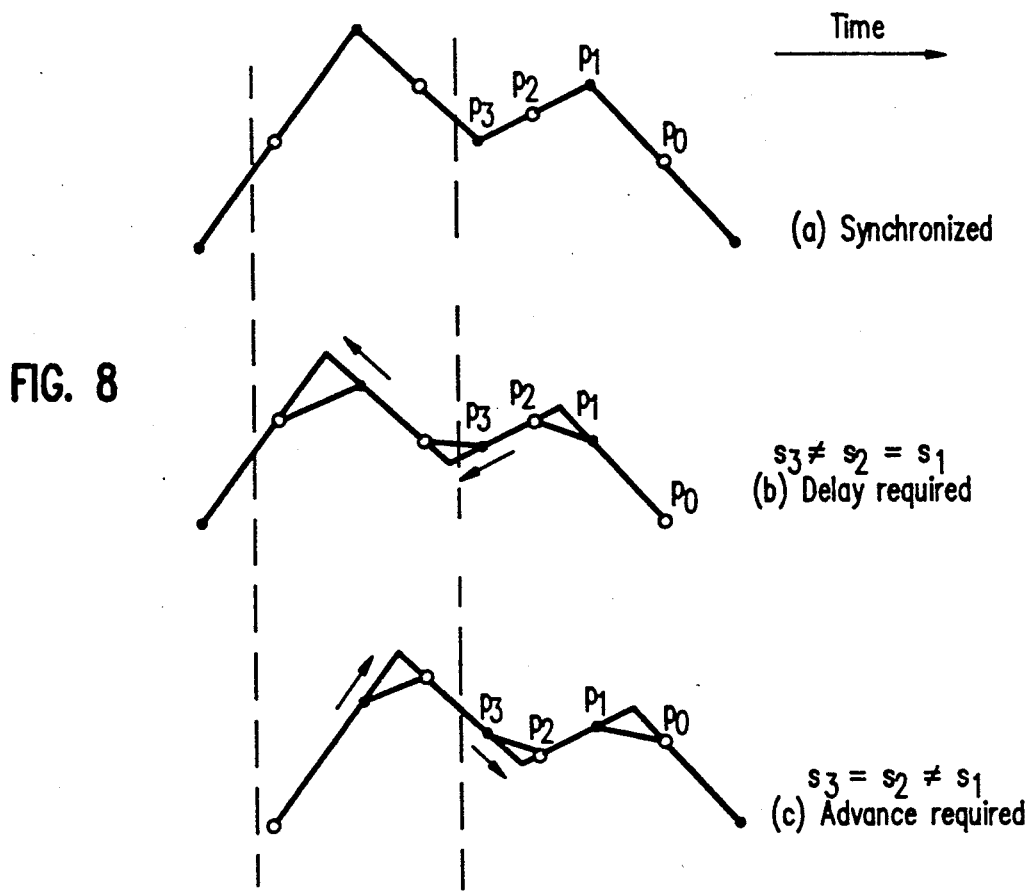

| INSTRUCTION | OPC1 | OPC0 | CLR | COJ | OPERATION | CYCLES |
|---|---|---|---|---|---|---|
| VCMAD | 0 | 0 | 0 | 0 | $C[i] \Leftarrow C[i] + Y \times D[i]$ | $9 + (N \times 8)$ |
|  | 0 | 0 | 0 | 1 | $C[i] \Leftarrow C[i] + Y \times D[i]*$ |  |
|  | 0 | 0 | 1 | 0 | $C[i] \Leftarrow Y \times D[i]$ |  |
|  | 0 | 0 | 1 | 1 | $C[i] \Leftarrow Y \times D[i]*$ |  |
| VCMUL | 0 | 1 | 0 | 0 | $C[i] \Leftarrow C[i] \times (1 + D[i])$ | $9 + (N \times 8)$ |
|  | 0 | 1 | 0 | 1 | $C[i] \Leftarrow C[i] \times (1 + D[i]*)$ |  |
|  | 0 | 1 | 1 | 0 | $C[i] \Leftarrow C[i] \times D[i]$ |  |
|  | 0 | 1 | 1 | 1 | $C[i] \Leftarrow C[i] \times D[i]*$ |  |
| VCMAC | 1 | 0 | 0 | 0 | $A \Leftarrow A + \text{SIGMA}(C[i] \times D[i])$ | $6 + (N \times 8)$ |
|  | 1 | 0 | 0 | 1 | $A \Leftarrow A + \text{SIGMA}(C[i] \times D[i]*)$ |  |
|  | 1 | 0 | 1 | 0 | $A \Leftarrow \text{SIGMA}(C[i] \times D[i])$ |  |
|  | 1 | 0 | 1 | 1 | $A \Leftarrow \text{SIGMA}(C[i] \times D[i]*)$ |  |
| VCMAG | 1 | 1 | 0 | 0 | $A \Leftarrow A + \text{SIGMA}(C[i] \times C[i])$ | $5 + (N \times 8)$ |
|  | 1 | 1 | 0 | 1 | $A \Leftarrow A + \text{SIGMA}(C[i] \times C[i]*)$ |  |
|  | 1 | 1 | 1 | 0 | $A \Leftarrow \text{SIGMA}(C[i] \times C[i])$ |  |
|  | 1 | 1 | 1 | 1 | $A \Leftarrow \text{SIGMA}(C[i] \times C[i]*)$ |  |

FIG. 6

| DS1 | DS0 | EXTERNAL BUFFER SIZE (DM) | CONSTANT ADDRESS BITS | INCREMENTED ADDRESS BITS |
|---|---|---|---|---|
| 0 | 0 | 8 | A0, A5 – A23 | A1 – A4 |
| 0 | 1 | 16 | A0, A6 – A23 | A1 – A5 |
| 1 | 0 | 32 | A0, A7 – A23 | A1 – A6 |
| 1 | 1 | 64 | A0, A8 – A23 | A1 – A7 |

FIG. 7

FINE TIMING RECOVERY FOR QAM MODEM RECEIVER

This application is continuation of U.S. Ser. application No. 07/563,434, filed Aug. 7, 1990 now abandoned.

BACKGROUND OF THE INVENTION

1. Field of the Invention

The present invention relates to timing recovery in a modem receiver and, in particular, to fine-timing recovery for a quadrature amplitude modulation (QAM) modem receiver.

2. Discussion of the Prior Art

The basic function of any communications system is to transmit information over a communication channel from an information source to a destination as fast and as accurately as possible.

There are two general types of information sources. Analog sources, such as a telephone microphone, generate a continuous signal. Digital sources, such as a digital data processing system, generate a signal that consists of a sequence of pulses.

Communications channels that are designed to transmit analog signals (e.g., the telephone network) have characteristics which make it difficult for them to transmit digital signals. To permit the transmission of digital pulse streams over an analog channel, it is necessary to utilize the digital data pulses to modulate a carrier waveform that is compatible with the analog transmission channel.

The equipment that performs the required modulation is generally referred to as a "MODEM". The term "MODEM" is an acronym for MOdulator-DEModulator, since one piece of equipment typically includes the capability not only to modulate transmitted signals, but also to demodulate received signals to recover the digital data from the modulated analog carrier waveform.

While passing through the transmission channel, the modulated carrier waveform suffers from distortion introduced both by the system itself an by noise contamination. Thus, one of the tasks of the modem's demodulating receiver function is to filter the signal received from the transmission channel to improve the signal-to-noise ratio. The modem receiver also recovers timing information from the received signal to provide sampling points for recovering the digital data. The modem receiver may also condition the data in other ways to make it suitable for additional processing.

In a conventional modem, the signal filtering, timing recovery and conditioning tasks are performed by three functional units: analog-to-digital conversion circuitry ("analog front end") that converts the received modulated carrier waveform to a digitized replica, a digital signal processor (DSP) that retrieves the digital data from the digitized replica using a recovered timing signal, and a control function for controlling both the analog front end and the DSP. The DSP recovers the data by implementing a signal conditioning and data recovery algorithm that is specific to the type of data being received.

For example, the DSP function in a facsimile (fax) machine modem implements a special purpose algorithm that can only be used for recovering digital fax data. In the case of a fax system, the data to be recovered is a digital bit map that corresponds to the transmitted hard copy image and which has been compressed to facilitate efficient transmission. The algorithm implemented by the digital signal processor function of the receiving fax machine's modem is a dedicated "fax" algorithm that has been designed specifically for accurately recovering the compressed bit map. It cannot recover digital data in a format other than a compressed bit map, e.g. voice mail data or data modem applications. A different digital signal processor implementing a different dedicated "voice mail" or "data modem" algorithm is needed for each of these other applications.

As shown in FIG. 1, a conventional fax machine architecture may be partitioned into two major functional blocks: a special purpose fax modem block 1 of the type described above for recovering a compressed bit map from a modulated carrier waveform and a general purpose processor block 2 for performing those tasks required to convert the compressed bit map to a corresponding hard copy image.

Quadrature amplitude modulation, or QAM is the independent amplitude modulation of two orthogonal channels using the same carrier frequency.

Fine-timing recovery is a critical operation in a QAM modem. Previous QAM timing recovery methods require significant CPU power to implement in a software modem. In addition, the long feedback delays inherent in conventional QAM modems are difficult to tune and can lead to unstable operation.

SUMMARY OF THE INVENTION

The present invention provides fine-timing recovery in a QAM modem receiver using minimal CPU power and short feedback delay.

In accordance with the invention, fine-timing is done on the baseband signal sampled at two complex points per symbol. Based on this information, the algebraic signs of the second derivative of the baseband signal are estimated. These signs, computed separately for the real and imaginary axes, are used to reach a local decision regarding the concavity or convexity of the baseband signal. By accumulating these local decisions over an appropriate time interval, a global decision is reached regarding the sampling point position relative to the baseband signal maxima/minima. Based on this global decision, a correction command is issued to the modem's analog front end to either advance or delay the sampling timing.

A better understanding of the features and advantages of the present invention will be obtained by reference to the following detailed description and accompanying drawings which set forth an illustrative embodiment in which the principles of the invention are utilized.

DESCRIPTION OF THE DRAWINGS

FIG. 5 is a table illustrating the memory organization of a complex vector for use in a DSP module in accordance with the present invention.

FIG. 6 provides an instruction set summary for a DSP module in accordance with the present invention.

FIG. 7 is a table illustrating the handling of cyclic buffers for a DSP module in accordance with the present invention.

FIG. 8 is a graph illustrating conditions for sampling timing advance/delay in accordance with the present invention.

DETAILED DESCRIPTION OF THE INVENTION

Figure 1:
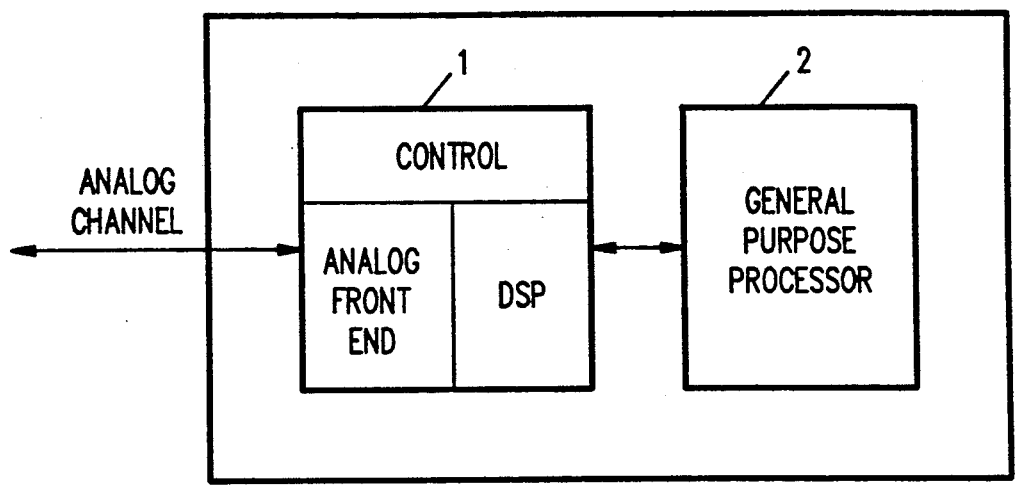
FIG. 1 is a block diagram illustrating the basic functional partitioning of a conventional facsimile system.
Figure 2:
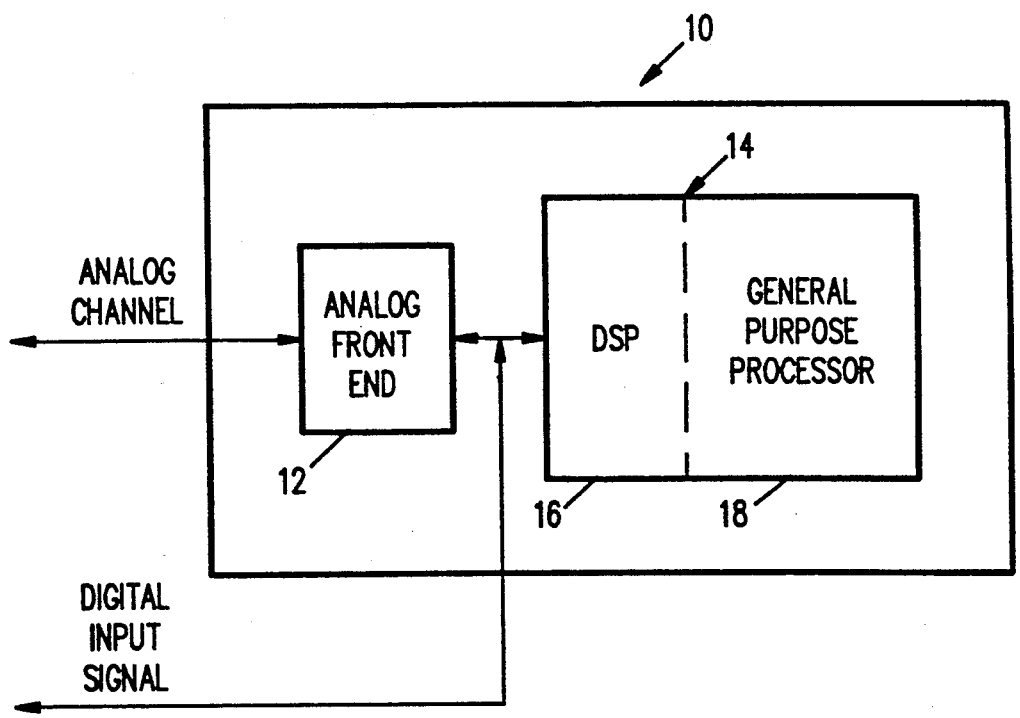
FIG. 2 is a block diagram illustrating the basic functional partitioning of a data processing system in accordance with the present invention.

FIG. 2 shows a data processing system 10 that includes two primary functional elements: an analog front end 12 and an integrated processing platform 14. The integrated processing platform 14 includes both a digital signal processor (DSP) module 16 and a general purpose processor (GPP) 18.

The analog front end 12 converts a modulated input signal received from an analog transmission channel, e.g. a telephone line, to a digitized replica of the modulated input signal. The analog front end 12 can be implemented utilizing conventional, off-the-shelf integrated circuit products available for this purpose.

As stated above, the integrated processor platform 14 includes a DSP module 16 that recovers digital data from the digital signal generated by the analog front end 12. The DSP module 16 includes a processing mechanism, described in greater detail below, that conditions the digital signal utilizing an algorithm comprising a selected sequence of DSP operations.

The general purpose processor 18 controls the DSP module 16 and processes the digital data generated by the DSP module 16 to a desired end result. The general purpose processor 18 may be any conventional state-of-the-art microprocessor.

As further shown in FIG. 2, while in many applications, the analog front end 12 will be utilized to convert a modulated input signal received on an analog channel to a corresponding digital signal, there are a growing number of applications (e.g., ISDN and T1) in which a digital input signal will be received by the integrated processor platform 14 directly from a digital source.

Figure 3:
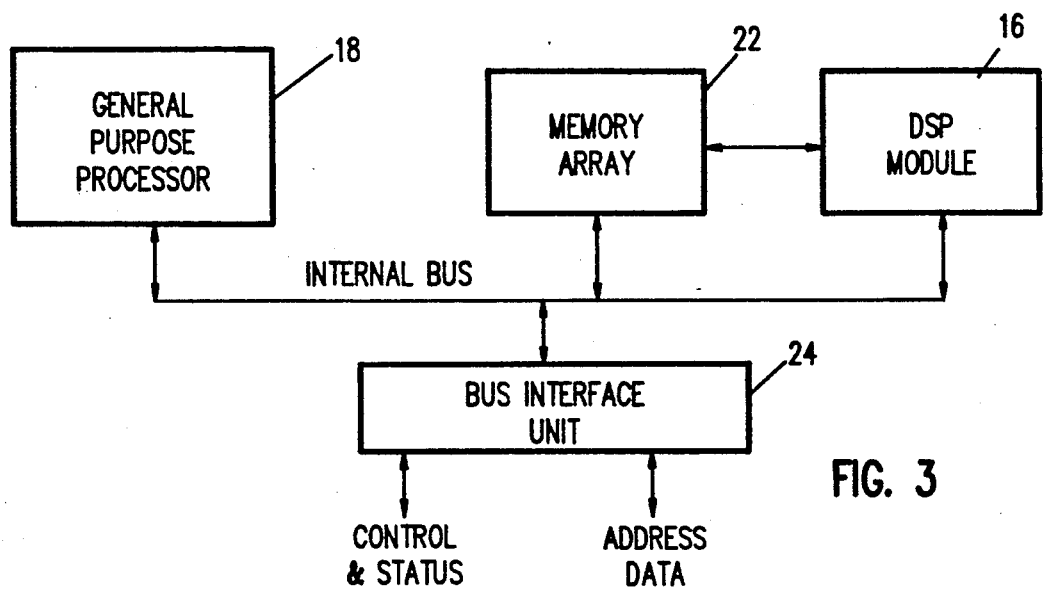
FIG. 3 is a block diagram illustrating the primary functional units of a data processing system in accordance with the present invention.

Referring to FIG. 3, both the DSP module 16 and the general purpose processor 18 are connected to an internal bus 20, allowing both the DSP module 16 and the general purpose processor 18 to communicate with a system memory (not shown) via a conventional bus interface unit 24 for transfer of control/status information and addresses/data therebetween. It will be understood by those skilled in the art that the internal bus 20 comprises both an internal address bus for handling address references by both the DSP module 16 and the general purpose processor 18 and an internal data bus for handling instruction and data transfers.

To save bus bandwidth, the DSP module 16 stores operands used in executing DSP algorithms in an internal RAM memory array 22 which, as will be described in greater detail below, is also accessible to the general purpose processor 18. That is, the internal memory array 22 serves as a shared resource for both the DSP module 16 and the general purpose processor 18. In the illustrated embodiment, the internal memory is shown as accessible by the DSP module 16 and the general purpose processor 18 via the internal bus 20. It will be understood by those skilled in the art that other bus structures would also provide the desired shared accessibility to the internal memory array 22; for example, the internal memory array 22 could be implemented as a dual port memory.

As described in greater detail below, the DSP module 16 may fetch operands in parallel from the internal memory array 22 and system memory.

The DSP module 16 executes vector operations on complex variables that are optimized for DSP applications. The general purpose processor 18 treats the DSP module 16 as a memory mapped I/0 device that occupies a reserved memory space, interfacing with the DSP module 16 via a set of memory mapped registers.

Figure 4:
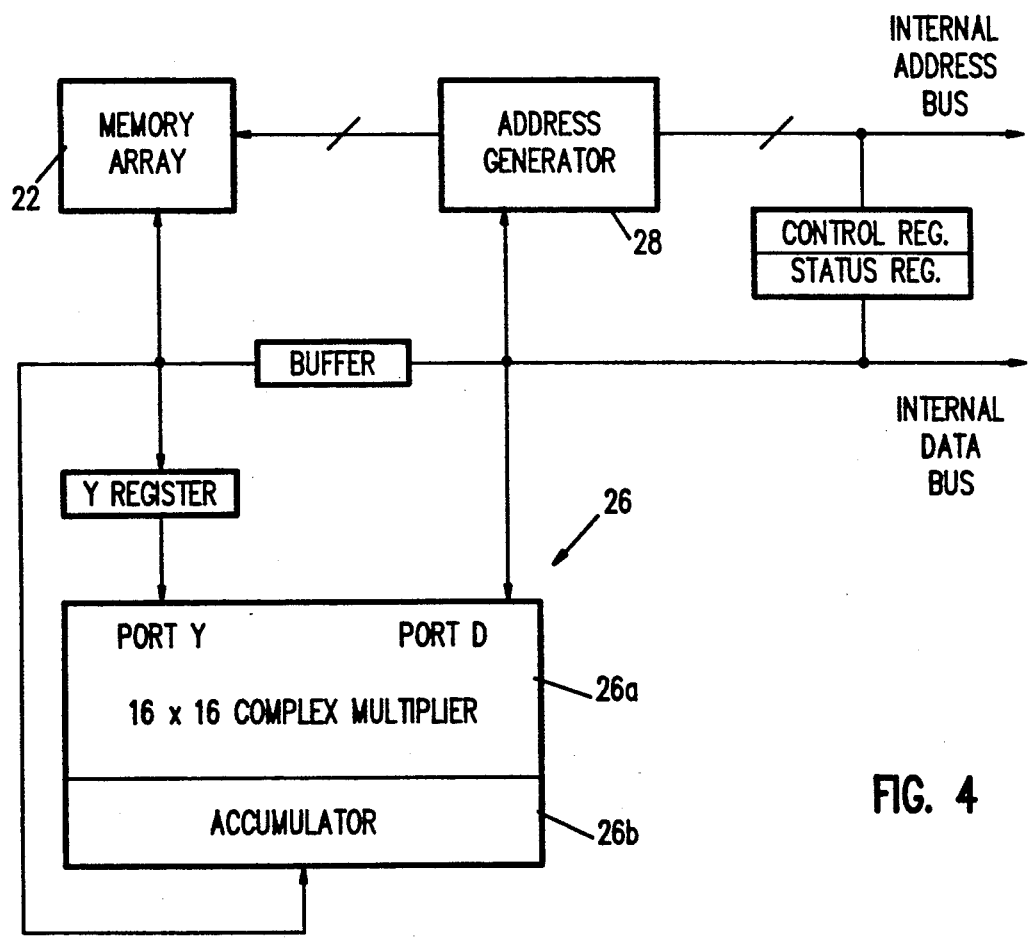
FIG. 4 is a block diagram illustrating a DSP module utilizable in a data processing system in accordance with the present invention.

As shown in FIG. 4, the DSP module 16 use the internal shared memory array 22 as well as a multiplier/accumulator 26. The DSP module 16 also includes its own internal address generator 28 for system memory and internal operand accesses, thus reducing the load on the general purpose processor 18. Both the multiplier/accumulator 26 and the address generator 28 are conventional implementations.

In the operation of the data processing system 10, the general purpose processor 18 selects from a basic set of DSP operations to define a specific sequence of operations as the DSP algorithm to be executed by the DSP module 16 for recovering data from the incoming digital signal. The general purpose processor then retrieves operands required for execution of the selected DSP algorithm, and/or instructions and data critical to the general purpose processor for controlling the DSP module 16 or for performing general purpose tasks, and loads them into the internal RAM array 22. The general purpose processor then invokes the first DSP operation in the selected sequence by issuing the corresponding command to the control register of the DSP module 16. The DSP module then places the general purpose processor 18 in a continuous wait state while it performs the first DSP operation utilizing operands retrieved by the address generator 28 from the RAM array 22 and system memory. Upon completion of the DSP operation, the DSP module cancels the continuous wait state and the general purpose processor 18 then either reads the status of the DSP module 16 or the result of the DSP operation or carries on with the execution of its normal program flow, which may be either invoking the next DSP operation in the selected sequence by issuing the appropriate command to the DSP module control register or performance of a general purpose task. This process continues until the selected sequence of DSP operations has been completed. The general purpose processor may then download the contents of the shared internal RAM array 22 and retrieve a new set of operands, instructions and data for further DSP operations or general purpose processing tasks.

As further shown in FIG. 4, the DSP module 16 performs complex arithmetic calculations on two vector operands provided in the multiplier/accumulator 26 at Port Y and Port D. One vector is retrieved from the internal memory array 22. The other vector is either organized as a circular buffer in the system memory (described in greater detail below) or retrieved from the internal memory array 22.

The DSP module 16 executes vector operations in a two stage pipeline. This allows for a significant performance enhancement as the fetch and execution of operands for consecutive vector elements are performed simultaneously rather than in a strictly sequential manner. The DSP module 16 can fetch up to two data elements at a time, using its address generator 28 for system memory access and the internal array 22 for the second operand. While fetching operands for one vector element, the DSP module 16 performs the multiply and add operations on the previous vector element.

The DSP module 16 contains seven registers in addition to the RAM array 22. These registers, as well as the internal memory array 22, are accessed by the general purpose processor 18 as memory-mapped I/0 devices. Each storage location in the internal memory array 22 is 32 bits wide and holds one complex number.

As stated above, the internal memory array 22 is not limited to storage of filtering coefficients for a specific DSP algorithm. It can also be used as a fast, zero-wait state, integrated memory for storing instructions and data utilized by the general purpose processor 18 as well as for storing selected operands for use by the DSP module 16 for processing a variety of data signal formats.

The memory array 22 can be used for instruction fetches with only one restriction: instructions must be loaded into the array 22 using word aligned accesses. This can be achieved by moving the aligned doubleword from system memory to memory array 22. Data can also be stored in the memory array 22 with one restriction: storing data in the array 22 can be done only if all the data is written using aligned word or doubleword accesses.

The multiplier input register Y is a 32-bit register that holds one complex operand. The multiplier input register Y is mapped into two consecutive words called Y0 and Y1.

The accumulator register A is a 32-bit register that holds one complex result. The A register is mapped into consecutive words, also called A0 and A1. Internally, A0 and A1 are 32-bit registers. However, only bits 15–30 (i.e., 16 bits) are visible. The rest of the bits are used for a higher dynamic range and intermediate calculations.

The operation of the DSP module 16 will now be described in greater detail; the following terms will be used in the operational description:

| | |
|---|---|
| C[i] | A complex entry in internal memory array 22, entry [i] can be selected by address generator 28 or directly accessed by CPU 18; |
| D[i] | Complex data from system memory fetched using address generator 28; |
| Y | Complex Multiplier input register 30 in FIG. 4; |
| D[i]* | The complex conjugate of D[i]; |
| A | Complex Accumulator register. |

The DSP module 16 executes the following six basic commands:

| | |
|---|---|
| VCMAC | Vector Complex Multiply Accumulate |
| VCMAG | Vector Complex Magnitude |
| VCMAD | Vector Complex Multiply Add |
| VCMUL | Vector Complex Multiply |
| LOAD | Write into C, Y, A or CTL |
| STORE | Read from C, Y, A, ST or CTL |

The VCMAC, VCMAD and VCMUL commands use the following parameters:

| | |
|---|---|
| D | Vector Start Address in system memory |
| C | Vector Start Address in internal RAM |
| | Vector Length |
| | Control bits |

The VCMAG command uses only the last three operands.

Complex numbers are organized in the internal memory array 22 as double words. Each double word contains two 16-bit 2's complement fixed-point fractional integers. The less significant word contains the Real part of the number. The most significant word contains the Imaginary part of the number.

The complex vectors utilized by the DSP module 16 consist of arrays of complex numbers stored in consecutive addresses. Complex vectors must be aligned to double word boundary. FIG. 5 illustrates the memory organization of a vector D.

Referring back to FIG. 4, the arithmetic logic unit 26 of the DSP module 16 contains a 16×16 multiplier 26a and a 32-bit adder/accumulator 26b. Bits 15–30 (16 bits) of the result are rounded and can be read by accessing the A register. If an overflow is detected during an operation, the Status Register (ST) overflow bit and either the OP0 bit or the OP1 bit is set to "1."

When data is loaded into the adder/accumulator 26b, the 16 bits of data are loaded into bits 15–30, the lower bits are set to "0," while bit 31 gets the same value as bit 30 (sign extended). An overflow is detected whenever the value of bit 30 is different from the value of bit 31.

Each basic DSP operation or instruction to be performed by the DSP module 16 is controlled by two OP-code bits (OPC0 and OPC1) and two specifiers (COJ and CLR). COJ specifies whether the operand on port D of the multiplier 26a must be conjugated prior to multiplication. The CLR bit is used to extend the instruction set. On VCMAC and VCMAG, CLR specifies whether the accumulator 26b must be cleared at the beginning of the vector operation. On VCMAD, CLR specifies that the operation will ignore the value of C[i]. In VCMUL, CLR indicates that the value of D[i] is to be taken instead of 1+D[i].

FIG. 6 provides a summary of the set of basic DSP operations executed by the DSP module 16 as a function of the OPC1, OPC0, COJ, and CLR bits in the CTL register. In FIG. 6, "SIGMA" represents the summation sign $$\sum_{i=1}^{N}$$

All the operands are complex numbers. Thus, $A=$ SIGMA $C[i] \times D[i]$ breaks down to:

$Re(A)=$Sigma
    $\{Re(C[i]) \times Re(D[i]) - Im(C[i]) \times Im(D[i])\}$ $Im(A)=$Sigma
    $\{Re(C[i]) \times Im(D[i]) + Im(C[i]) \times Re(D[i])\}$ The accumulator 26b, the multiplier input register Y, the external data pointer DPTR and the coefficient pointer CPTR registers are used as temporary registers during vector operations. Values stored in these register prior to activation of the DSP module 16 are destroyed. If the content of the accumulator register A after an operation of the DSP module 16 is used as an initial value for the next operation, it must be remembered that the least significant bits may contain a value of other than zero.

As stated above, the DSP module 16 accesses arrays of data in external memory using the DPTR pointer as an address. The DS0 and DS1 bits of the CTL register control the size of the array. The DSP module 16 allows a convenient way of handling data arrays as a FIFO. Only the appropriate number of the least significant bits of the DPTR are incremented on each access. The upper bits remain constant. FIG. 7 shows which bits are incremented. The rest remain constant.

Additional information regarding the data processing system 10 may be obtained by reference to co-pending and commonly-assigned U.S. Pat. application Ser. No. 467,148, INTEGRATED DIGITAL SIGNAL PROCESSOR/GENERAL PURPOSE CPU WITH SHARED INTERNAL MEMORY, filed Jan. 18, 1990 by Amos Intrater et al, which application is hereby incorporated by reference to provide background for the present invention.

In some applications the signal received by the data processing system 10 may be a quadrature amplitude modulated (QAM) signal. The present invention provides a fine-timing recovery procedure for utilizing the system 10 as a quadrature amplitude modulation (QAM) modem receiver.

The fine-timing algorithm of the present invention is a step within another algorithm which causes the above-described system 10 to implement a QAM modem receiver entirely in software. The modem algorithm includes several other steps before and after the fine-timing step that prepare input for it and then use its output, as described below.

The modem algorithm, of which the fine-timing algorithm is a part, is implemented as a subroutine that is called periodically at the appropriate baud rate. In this way, each activation of the modem routine corresponds to a single data symbol. On each activation, the modem routine obtains several digitized samples of the analog signal being carried by the phone line and, performs filtering, demodulation and decoding operations according to the relevant protocol in order to extract the corresponding transmitted data bits.

The purpose of the fine-timing algorithm is to track and compensate for any drifts in synchronization between the sampling clocks of the transmitter modem and the modem receiver. A preliminary coarse-timing step is done once at modem start up during the training. The task of the fine-timing algorithm is to improve this coarse-timing synchronization and then to continuously monitor it and correct any deviation from synchronization as long as data are being transferred.

The fine-timing algorithm operates in the baseband, that is, on demodulated lowpass-filtered samples. Two complex points per symbols are used. The first point of each symbol is assumed to lie near the center of the current symbol; the second point is assumed to lie near the transition between adjacent symbols.

As stated above, a preliminary coarse-timing step synchronizes the modem routine activations with respect to the stream of complex demodulated points so as to conform to the above assumptions as much as possible. The continuous operation of the fine-timing algorithm ensures that these assumptions are true throughout the data reception duration.

The output of the algorithm consist of two kinds of operations: updating the internal score accumulator of the system 10 and issuing timing commands to the analog front end 12.

The purpose of the internal score accumulator in this application and the method of updating it are described in greater detail below.

As stated above, the analog front end 12 is used for sampling the phone line and, thus, for providing the modem routine with the corresponding digitized samples. It can also accept timing commands, causing it to delay or advance the next sampling instant by a certain fixed amount. In this way, the sampling instants can be resynchronized with the actual analog signal timing, in case a drift is detected, so as to keep these drifts below the critical level required for correct operation in subsequent steps of the modem algorithm.

It is possible to cause timing resynchronization by different methods other than by issuing timing commands to an AFE, e.g. by DSP filtering methods. The fine-timing algorithm described herein is not concerned with how the actual timing is implemented, but rather with how a drift is detected, when to issue such a command, and in what direction (advance or delay). Therefore, the algorithm can also be used, as is, in cases where timing is achieved by other means. The mention of an AFE should only serve as a concrete example and should not be considered as an integral part of the algorithm itself.

The fine-timing algorithm operates in two stages. First, a local decision is reached as to the position of peaks in the baseband signal trajectory in the complex plane, relative to the sample points on this trajectory that are used as input to the algorithm. This local decision is used to update the internal score accumulator. Then, based on the value of the score accumulator, a global decision is made whether or not to issue a timing command and, if so, in which direction (advance or delay).

Peak points in the baseband signal trajectory are assumed to fall, on the average, near the actual constellation points in the complex plane. When this trajectory is projected on the real and imaginary axes, the peak points correspond to maxima or minima in either the real or imaginary projection, or in both. Although not every passage near a constellation point should give rise to such a maximum or minimum, there is a sufficient number that do. This is true since the baseband signal trajectory is restricted to a bounded region in the complex plane and, therefore, must constantly bend back into this region. These bends occur near the constellation points where the baseband signal changes direction and are characterized as maxima or minima in the projections on the real and imaginary parts.

In this way, the estimation of the relative position of peak points in reduced to a separate estimation of the relative position of maxima and minima of the real and imaginary parts. This can be done by estimating the sign of the second-order derivative of these signals, evaluated at the input sample points. A positive sign corresponds to a place near a local minimum; a negative sign corresponds to a place near a local maximum. By a careful consideration of these signs at the input sample points, it is possible to reach a local decision as to the position of the actual minima and maxima relative to these points.

FIG. 8 shows the situation for a single projection of the baseband signal on the real or imaginary axis. The sample points $p_0, p_1$ correspond to the current symbol and points $p_2, p_3$ correspond to the previous symbol.

The odd-numbered points $p_1,p_3$ are assumed to lie near the local maximum or minimum, and the even-numbered points $p_0,p_2$, are assumed to lie near the transitions. FIG. 8(a) shows the case when the timing is fully synchronized. FIG. 8(b) shows the case where a delay command should be given, and FIG. 8(c) shows the case where an advance command should be given in order to restore synchronization.

The sign of the second-order derivatives at the points $p_0,p_1,p_2,p_3$ is given by $s_0,s_1,s_2,s_3$, respectively. As can be seen from FIG. 8, these two cases can be distinguished by the conditions:

$$s_3 \neq s_2 = s_1 \rightarrow \text{Delay required} \quad (1)$$

$$s_3 = s_2 \neq s_1 \rightarrow \text{Advance required}$$

Both of these conditions are characterized by:

$$s_3 \neq s_1 \quad (2)$$

In cases where $s_3 = s_1$, the algorithm cannot reach any local decision regarding the position of a maximum or minimum relative to the sample points.

The information obtained by the local estimation stage is used to update the internal score accumulator. A local "delay required" decision receives a score of −1. A local "advance required" decision receives a score of +1. "No decision" receives a score of 0. The score of local decisions from both the real and imaginary signals are summed and are added to the score accumulator.

Considering the contribution of a single part (real or imaginary) to the score accumulator, the eight possibilities for signs of the second-order derivative at $p_1,p_2,p_3$ can be arranged as shown in Table 1.

TABLE 1

| \multicolumn{6}{c}{Score Contribution from a Single Part} |
|---|---|---|---|---|---|
| $s_3$ | $s_2$ | $s_1$ | Score | $c_1$ | $c_2$ |
| 0 | 0 | 0 | 0 | 0 | 0 |
| 0 | 0 | 1 | +1 | 1 | 1 |
| 0 | 1 | 0 | 0 | 0 | 1 |
| 0 | 1 | 1 | −1 | 1 | 0 |
| 1 | 0 | 0 | −1 | 1 | 0 |
| 1 | 0 | 1 | 0 | 0 | 1 |
| 1 | 1 | 0 | +1 | 1 | 1 |
| 1 | 1 | 1 | 0 | 0 | 0 |

The two columns labelled $c_1,c_2$ correspond to the conditions given in Eqs. 2 and 1, respectively. Using a bitwise XOR operation ($\oplus$), these conditions can be written as, $$c_1 = s_1 \oplus s_3 \quad (3)$$

$$c_2 = s_1 \oplus s_2$$

The score contribution of both the real and imaginary parts is shown in Table 2.

When the absolute value of the score accumulator reaches a certain threshold, this fact is taken as an indication that the baseband signal timing should be corrected by a timing command. In this case, a negative score value requires a delay command, and a positive score value requires an advance command. Once a timing is given, in either direction, the score accumulator is reset to 0.

The appropriate threshold value is a function of the admissible skew between the transmitter and receiver sampling clocks, the received signal characteristics and the admissible level of noise that can be tolerated by the subsequent steps of the modem routine. In order to ensure that the rate of timing commands does not become too high, a counter is used to allow a timing command only if a certain tim interval has passed since the last timing command. The appropriate values for both the score threshold and the limiting time interval are determined empirically.

| $c_1c_2$ Im→ | 00 | 01 | 10 | 11 | 11 | 10 | 00 | 01 |
|---|---|---|---|---|---|---|---|---|
| Re ↓ $s_3s_2s_1$ | 000 | 001 | 010 | 011 | 100 | 101 | 110 | 111 |
| 00  000 | 0 | 0 | −1 | +1 | +1 | −1 | 0 | 0 |
| 01  001 | 0 | 0 | −1 | +1 | +1 | −1 | 0 | 0 |
| 10  010 | −1 | −1 | −2 | 0 | 0 | −2 | −1 | −1 |
| 11  011 | +1 | +1 | 0 | +2 | +2 | 0 | +1 | +1 |
| 11  100 | +1 | +1 | 0 | +2 | +2 | 0 | +1 | +1 |
| 10  101 | −1 | −1 | −2 | 0 | 0 | −2 | −1 | −1 |
| 00  110 | 0 | 0 | −1 | +1 | +1 | −1 | 0 | 0 |
| 01  111 | 0 | 0 | −1 | +1 | +1 | −1 | 0 | 0 |

The fine-timing algorithm described above is designed to be used with a data processing system 10, i.e. a system that includes a 32-bit general-purpose CPU containing a hardware accelerator for DSP operations. Apart from general-purpose machine instructions (move, compare, add, etc.), it is assumed that instructions exist for bitwise operations (and, or xor, etc.) and that DSP operations like finite-duration Impulse Response (FIR) filtering are also part of the underlying instruction-set.

Complex numbers are represented by 32-bit words as follows, $$\begin{array}{|cc|cc|} \hline \text{MSB} & & & \text{LSB} \\ 31 & 16 & 15 & 0 \\ \hline \text{Imaginary} & & \text{Real} & \\ \hline \end{array} \quad (4)$$

The more-significant 16-bit half represents the imaginary part and the less-significant 16-bit part represents the real part. Each of these part is given in 2's-complement fixed-point representation. It follows that the allowed range for the real and imaginary parts is from −1 through $1-2^{-15}$. A 32-bit pair of 16-bit integers (y.x) represents the complex number $2^{-15}x + i2^{-15}y$, where i is the imaginary unit.

Estimation of the second-order derivation sign is done by an FIR filter operation. This is possible since the sample baseband points are equally spaced along the time axis. The second-order derivative at the sample point $p_n$, for $n=1,2$ can be estimated by a divided-difference expression, $$\frac{1}{\Delta T}\left(\frac{P_{n-1} - P_n}{\Delta T} - \frac{P_n - P_{n+1}}{\Delta T}\right) = \frac{P_{n-1} - 2P_n + P_{n+1}}{(\Delta T)^2} \quad (5)$$

Since only the sign is needed, and $\Delta T > 0$, it is enough to take the sign-bit of the following expression, $$P_{n-1} - 2P_n + P_{n+1} \quad (6)$$

This operation can be done simultaneously on both the real and imaginary parts, by taking the complex representation of the 3 baseband points $P_{n-1}, P_n, P_{n+1}$ and applying a 3-tap FIR filter with the following real coefficients $$(1,-2,1) \tag{7}$$

The complex output from this filter represents the expression in Eq. 6 for both the real and imaginary parts of the complex representation.

In each modem activation the procedure described above provides a complex number whose real and imaginary signs match those of the second-order derivative of the real and imaginary signals, respectively. By masking out all bits except the real and imaginary sign-bits, a 32-bit data-object is obtained that represents the results of the second-order derivative sign estimation for both the real and imaginary parts.

Counting bit positions as in Eq. 4 from 0 (least-significant bit) through 31 (most-significant bit), it can be seen that only bit positions 15 and 31 in this data-object can be non-zero. Bit position 15 corresponds to the real part; bit position 31 corresponds to the imaginary part. A "0" in these bit positions represents positive sign; a "1" represents negative sign. This data-object will be referred to as a complex sign object.

Using a bitwise and operation ($\odot$) and the following 32-bit mask, $$\text{mask} = 10000000000000001000000000000000 \tag{8}$$

the complex signs at $p_1, p_2, p_3$ are given by $$s_1 = (p_0 - 2p_1 + p_2) \odot \text{mask} \tag{9}$$

$$s_2 = (p_1 - 2p_2 + p_3) \odot \text{mask}$$

$s_3 = s_1$ from the previous modem activation

The corresponding complex conditions: $c_1, c_2$ can be computed from the complex signs by $$c_1 = s_1 \oplus s_3 \tag{10}$$

$$c_2 = s_2 \oplus s_2$$

Each of these conditions has the same format as a complex sign object. Bit position 15 corresponds to the real part; bit position 31 corresponds to the imaginary part.

TABLE 3

Score vs. Matrix Representation

| Score | Matrix Representation | | |
|---|---|---|---|
| 0 | $\begin{pmatrix} 0\ 0 \\ *\ * \end{pmatrix}$ | $\begin{pmatrix} 1\ 1 \\ 1\ 0 \end{pmatrix}$ | $\begin{pmatrix} 1\ 1 \\ 0\ 1 \end{pmatrix}$ |
| −1 | $\begin{pmatrix} 1\ 0 \\ 0\ * \end{pmatrix}$ | $\begin{pmatrix} 0\ 1 \\ *\ 0 \end{pmatrix}$ | |
| +1 | $\begin{pmatrix} 1\ 0 \\ 1\ * \end{pmatrix}$ | $\begin{pmatrix} 0\ 1 \\ *\ 1 \end{pmatrix}$ | |
| −2 | $\begin{pmatrix} 1\ 1 \\ 0\ 0 \end{pmatrix}$ | | |
| +2 | $\begin{pmatrix} 1\ 1 \\ 1\ 1 \end{pmatrix}$ | | |

Table 3 shows the possible score contribution using 2×2 matrix representation. In this representation, the top row corresponds to the complex $c_1$ condition; the bottom row corresponds to the complex $c_2$ condition. The left column corresponds to the imaginary part; the right column corresponds to the real part. An asterisk (*) stands for a "don't care" value.

As can be seen from Table 3, all the information needed for local decision as to incrementing the score accumulator is contained in the matrix representation. The advantage of using this representation is that the matrix rows can be efficiently calculated using the bitwise and xor operations, as shown in Eqs. 8 and 10.

Figure 9:
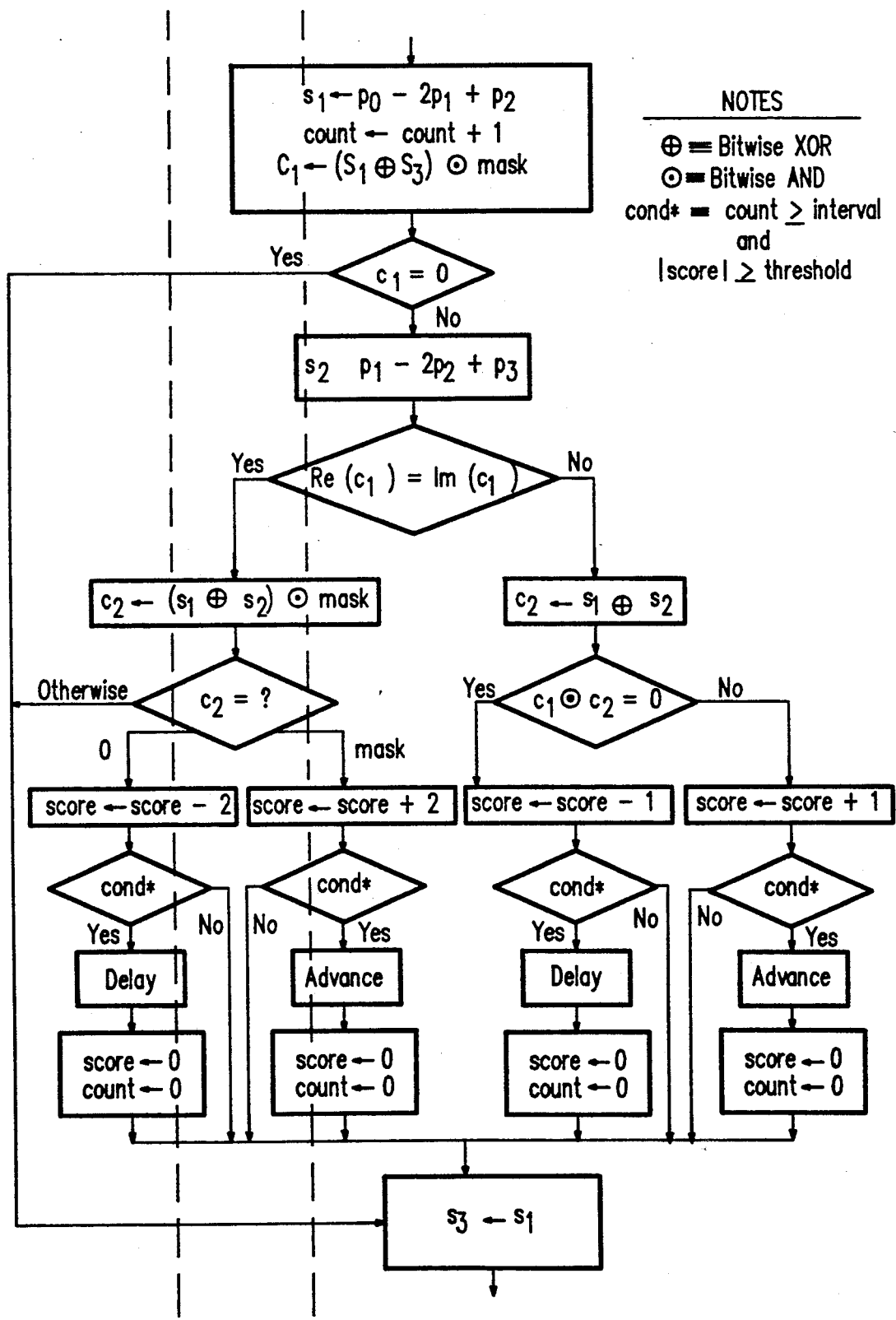
FIG. 9 is a flowchart of a fine-timing recovery method in accordance with the present invention.

A fine-timing algorithm flowchart is shown in FIG. 9. This flowchart describes the operations done on each modem activation.

The input to the algorithm are the new complex points: $p_1$ near the symbol's center and $p_0$ near the transition, as described above. The additional complex point $p_3$ needed as input is in fact the $p_1$ point from the previous modem activation. Since only its complex sign $s_3$ is needed, the $s_3$ is saved in the last stop of the algorithm as $s_3$ for the next activation.

The first operation is a FIR calculation of the complex sign $s_1$ and the corresponding complex condition $c_1$, as described above. A counter is used for counting the number of modem activations since the last timing command was issued. It is incremented on each modem activation and is reset upon issuing of a timing command. It is checked as part of the condition cond*, as shown in the FIG. 9 flowchart and described above.

A test is then made as to whether or not $c_1 = 0$, as a complex entity. This is true, only if both the real and imaginary parts are zero. In this case there is no contribution to the score accumulator, as shown in Table 3, so the entire algorithm can be skipped in this modem activation.

If not both the real and imaginary parts of $c_1$ are zero, then, according to Table 3, it is still possible that no contribution to the score accumulator will result in this modem activation, but $c_2$ must also be checked. Therefore, the next operation is an FIR calculation of the complex sign $s_2$. The masking operation is not yet applied, since this will happen as a by-product, as will be seen below.

In the next step, the algorithm identifies the cases with score contributions of $\pm 1$ and $\pm 2$. For the remaining possibility of zero score contribution, no action is taken. According to Table 3, the case of $\pm 1$ is characterized by the condition $\text{Re}(c_1) \neq \text{Im}(c_1)$. In this case, distinction between score contributions $\pm 1$ and $-1$ is done by considering the bit in $c_2$ below the "1" bit in $c_1$, in the matrix representation of Table 3. The other "don't care" bit in $c_2$ is located below a "0" bit in $c_1$ and can be masked-out by the operation $c_1 \odot c_2$, as shown in the FIG. 9 flowchart. Since in $c_1$ all bit-positions except 15 and 31 were already masked-out in the beginning of the algorithm, this eliminates the need to perform a masking operation where $c_2$ is computed.

In the $\pm 2$ case, it is necessary to also perform the masking operations for all bit positions except 15 and 31. The distinction between score contributions $+2$ and $-2$ is done by examining the value of the $c_2$ complex condition.

Once the appropriate score contribution is determined and the score accumulator is updated, then the condition for global decision cond* is checked, as described above. In case it is true, a timing command in the required direction is issued and both the score accumulator and the counter are reset to zero.

The last step in the algorithm is to save the current $s_1$ value as the $s_3$ value for the next modem activation, as described above.

It should be understood that various alternatives to the embodiments of the invention described herein may be employed in practicing the invention. It is intended that the following claims define the scope of the invention and that methods and apparatus within the scope of these claims and their equivalents be covered thereby.

What is claimed is:

1. A method for generating a correction command for advancing or delaying the sample timing of a modem analog front end used to recover data from an incoming QAM baseband signal said baseband signal having a second derivative and maxima/minima, the method comprising the steps of:
   (a) sampling baseband signal at two complex points per symbol;
   (b) utilizing the two complex points derived in step (a) to estimate the algebraic signs of the second derivative of the baseband signal, the signs being estimated separately for the real and imaginary axis;
   (c) utilizing the algebraic signs generated in step (b) to make a local decision regarding the convexity/concavity of said baseband signal;
   (d) accumulating said local decisions made in step (c) over a predetermined time period; and
   (e) utilizing the accumulated local decisions to make a global decision regarding the sampling point position relative to said baseband signal maxima/minima.

2. A method as in claim 1 and including the further step of, based on said global decision, issuing a correction command to said analog front end to either advance or delay said sample timing.

3. Apparatus for generating a correction command for advancing or delaying the sample timing of a modem analog front end to recover data from an incoming QAM baseband signal, said baseband signal having a second derivative and maxima/minima, the apparatus comprising:
   (a) sample means for sampling said baseband signal at two complex points per symbol;
   (b) estimator means for utilizing the two complex points to estimate the algebraic signs of the second derivative of said baseband signal, the algebraic signs being estimated separately for the real and imaginary axis;
   (c) local decision means for utilizing the algebraic signs to made a local decision regarding the convexity/concavity of said baseband signal;
   (d) accumulator means for accumulating said local decisions over a predetermined time period; and
   (e) global decision means for utilizing the accumulated local decisions to make a global decision regarding the sampling point position relative to said baseband signal maxima/minima.

4. Apparatus as in claim 3 and further comprising correction means for issuing a correction command to said analog front end to either advance or delay the timing based on the global decision.

* * * * *